United States Patent
States

(10) Patent No.: US 9,731,656 B1
(45) Date of Patent: Aug. 15, 2017

(54) STEERING WHEEL BOOK STAND

(71) Applicant: Robert Lee States, Long Beach, CA (US)

(72) Inventor: Robert Lee States, Long Beach, CA (US)

(*) Notice: Subject to any disclaimer, the term of this patent is extended or adjusted under 35 U.S.C. 154(b) by 0 days.

(21) Appl. No.: 14/757,167

(22) Filed: Nov. 30, 2015

(51) Int. Cl.
*B60R 11/00* (2006.01)
*B60R 7/08* (2006.01)

(52) U.S. Cl.
CPC ............... *B60R 7/08* (2013.01); *B60R 11/00* (2013.01); *B60R 2011/001* (2013.01); *B60R 2011/0082* (2013.01)

(58) Field of Classification Search
CPC .................. B60R 2011/001; B60N 3/005
USPC ........................................... 224/276
See application file for complete search history.

(56) References Cited

U.S. PATENT DOCUMENTS

| 6,648,193 B2 * | 11/2003 | Rioux | B60R 7/04 108/44 |
| 8,608,037 B2 * | 12/2013 | Stroh | B60N 3/005 108/44 |

\* cited by examiner

*Primary Examiner* — Justin Larson

(57) ABSTRACT

My invention is a steering wheel book stand. The purpose of the stand is to provide freedom and comfort to a reader while in their vehicle. The stand includes supports bars and a support plate that are adaptable to fit different size steering wheels.

1 Claim, 4 Drawing Sheets

STEERING WHEEL BOOK STAND

BACKGROUND

My steering wheel book stand provides a driver with the freedom to use their hands for other things and not a need to hold a book. The stand will maintain the book on the steering wheel, will alleviate the stress of holding the book, and will give hours of book reading comfort.

DETAILED DESCRIPTION

Figure 1:
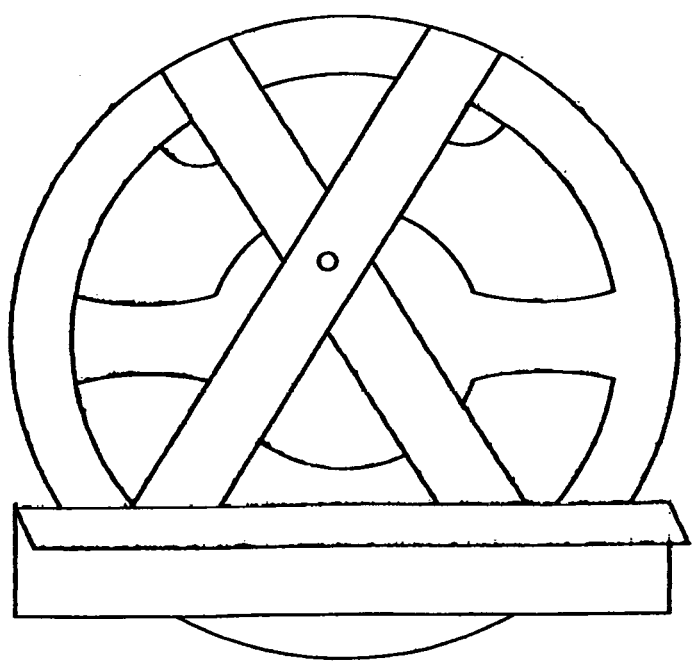
FIG. 1 is a front view of the steering wheel stand on a steering wheel
Figure 2:
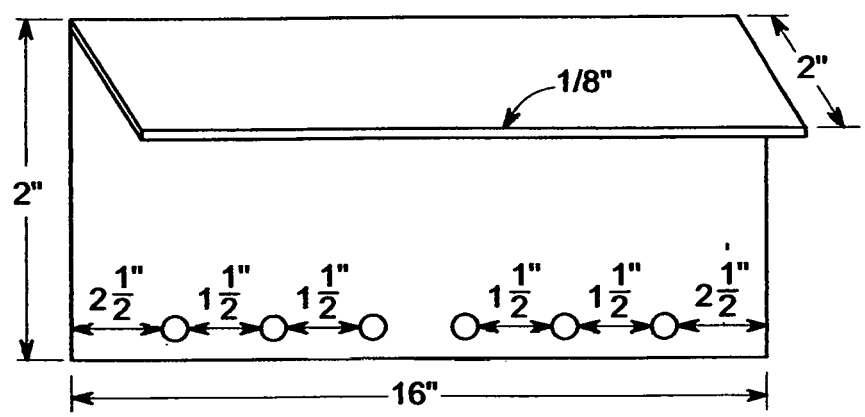
FIG. 2 is a front view of the stand plate
Figure 3:
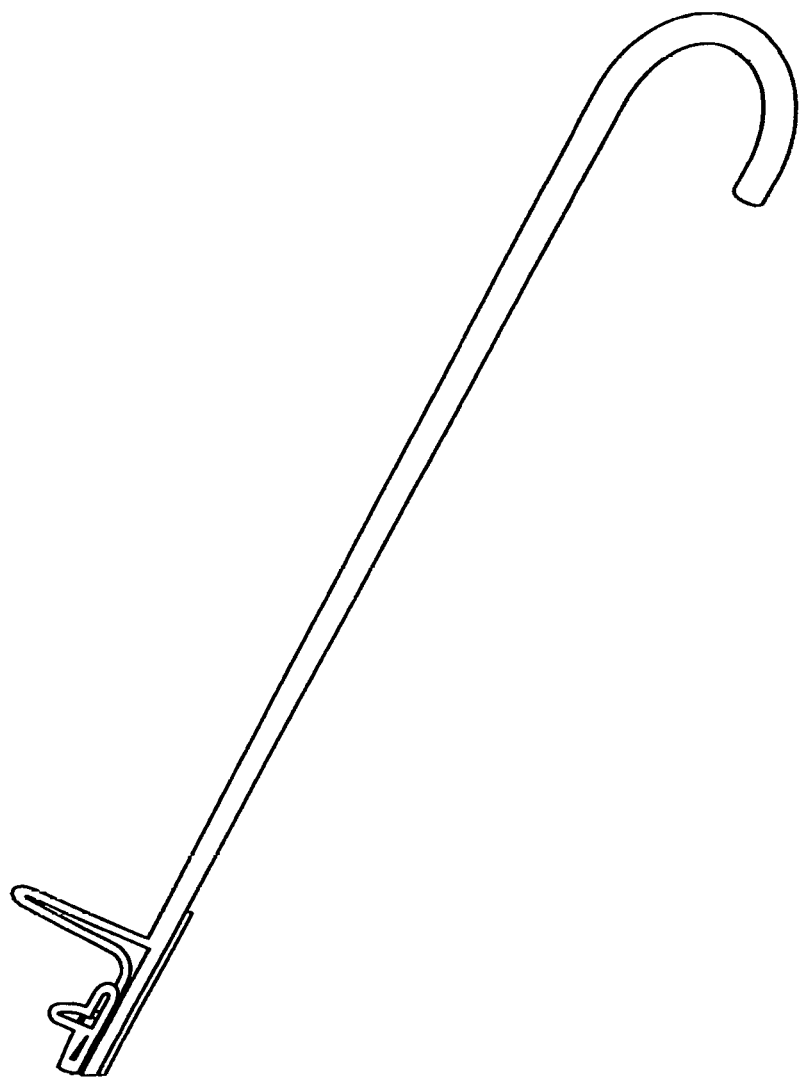
FIG. 3 is a side view of the steering wheel stand
Figure 4:
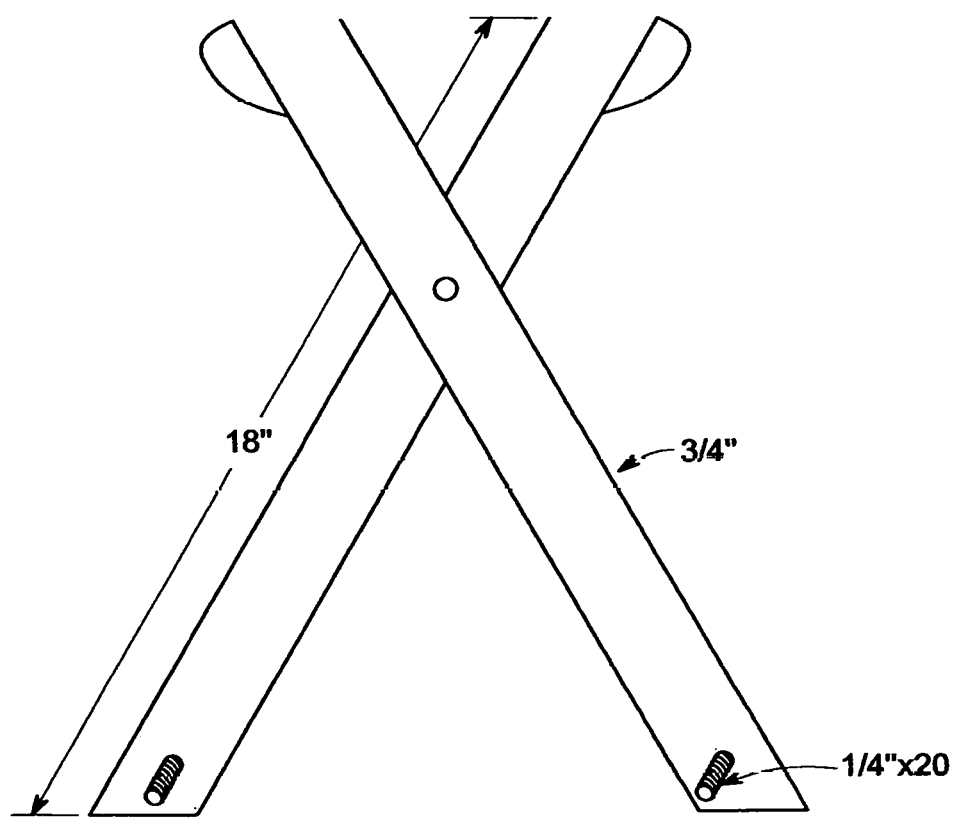
FIG. 4 is a front view of the support bars

The steering wheel book stand comprises two support bars and a stand plate. The support bars are pivotally attached together so as to fold like a scissor between a use and non-use position. The top end of each support bar includes a hook portion designed to engage a steering wheel near the 11 o'clock and 1 o'clock positions. Each support bar can be made from a ⅛" thick and 1" wide piece of aluminum that is 18" long not including the hooked portion. The stand plate can be made from a ⅛" thick, 1¼" wide piece of aluminum angle stock that is 16" long. The aluminum construction allows the book stand to be strong, light weight, easy to clean, and rust free. The stand plate includes a series of fastener holes for receiving a pair of wing nut fasteners which fasten each support bar to the stand plate. Adjusting the position of the wing nut fasteners in different holes on the stand plate will adjust the width of the book stand to fit different size steering wheels.

The invention claimed is:

1. A book stand for use on a steering wheel, the book stand comprising: a pair of support bars pivotally joined together, wherein each support bar includes a hooked portion at a top end thereof for engagement with the steering wheel, and wherein each support bar includes a fastener hole at a bottom end thereof; and a stand plate including at least four fastener holes along a length thereof; wherein a pair of wing nut fasteners are fed through the support bar fastener holes and corresponding ones of the at least four stand plate fastener holes to form an assembled book stand; wherein the wing nut fasteners can be fed through different ones of the at least four stand plate fastener holes in order to adjust the book stand to fit different size steering wheels.

* * * * *